United States Patent
Altimari et al.

(10) Patent No.: US 12,497,244 B2
(45) Date of Patent: Dec. 16, 2025

(54) DEVICE FOR LATERALLY GUIDING AN ENDLESS CONVEYOR BELT OF A TROUGH CONVEYOR

(71) Applicant: SOCIETE FINANCIERE DE GESTION, Roubaix (FR)

(72) Inventors: Samuel Altimari, Toufflers (FR); Olivier Benard, Auberville la Manuel (FR)

(73) Assignee: SOCIETE FINANCIERE DE GESTION, Roubaix (FR)

( * ) Notice: Subject to any disclaimer, the term of this patent is extended or adjusted under 35 U.S.C. 154(b) by 51 days.

(21) Appl. No.: 18/721,431

(22) PCT Filed: Dec. 9, 2022

(86) PCT No.: PCT/EP2022/085220
§ 371 (c)(1),
(2) Date: Jun. 18, 2024

(87) PCT Pub. No.: WO2023/110676
PCT Pub. Date: Jun. 22, 2023

(65) Prior Publication Data
US 2025/0051099 A1     Feb. 13, 2025

(30) Foreign Application Priority Data

Dec. 19, 2021   (FR) ...................................... 2113938

(51) Int. Cl.
*B65G 39/12*    (2006.01)
*B65G 15/08*    (2006.01)

(52) U.S. Cl.
CPC ........... *B65G 39/125* (2013.01); *B65G 15/08* (2013.01); *B65G 39/12* (2013.01)

(58) Field of Classification Search
CPC ...... B65G 39/125; B65G 15/08; B65G 39/12; B65G 21/06
See application file for complete search history.

(56) References Cited

U.S. PATENT DOCUMENTS

| 1,530,499 A | 3/1925 | Knode |
| 2,695,701 A | 11/1954 | Hagenbook |

(Continued)

FOREIGN PATENT DOCUMENTS

| EP | 1564166 A1 | 8/2005 |
| FR | 3037051 A1 | 12/2016 |

(Continued)

OTHER PUBLICATIONS

English translation of the Written Opinion of the International Searching Authority dated Apr. 11, 2023 for corresponding International Application No. PCT/EP2022/085220, filed Dec. 9, 2022.

(Continued)

*Primary Examiner* — Mark A Deuble
(74) *Attorney, Agent, or Firm* — David D. Brush; Westman, Champlin & Koehler, P.A.

(57) ABSTRACT

A lateral guiding device includes a support and an idle guide roller which is able to be mounted in a removable manner on the support between a first part making it possible, in an operational position, to support one end of the axle of the roller at an upper point, and a second part making it possible to support the other end of the axle of the roller at a lower point. The first part of the support is movable between the operational position and a retracted position. The support includes a retaining element which, when the first part is in the retracted position and does not support the roller, has the function of vertically retaining the roller in a removal position in which the second end of the axle of the roller is supported at the lower point by the second part.

48 Claims, 5 Drawing Sheets

(56) References Cited

U.S. PATENT DOCUMENTS

| | | | |
|---|---|---|---|
| 4,720,005 A | 1/1988 | Beresinsky | |
| 6,269,994 B1 | 8/2001 | Harrington | |
| 6,427,828 B1 | 8/2002 | East et al. | |
| 7,621,391 B2 * | 11/2009 | Matters | B65G 39/125 |
| | | | 198/825 |
| 7,950,520 B2 * | 5/2011 | Mott | B65G 39/12 |
| | | | 198/825 |
| 8,985,317 B2 * | 3/2015 | Martin | B65G 39/125 |
| | | | 198/828 |
| 9,139,367 B2 * | 9/2015 | Swinderman | B65G 15/08 |
| 9,517,891 B1 * | 12/2016 | Van Zee | B65G 39/12 |
| 11,919,719 B2 * | 3/2024 | Jasin | B65G 15/08 |
| 12,275,591 B1 * | 4/2025 | Guay | B65G 13/12 |
| 2004/0079621 A1 | 4/2004 | Mott | |
| 2007/0170044 A1 | 7/2007 | Matters et al. | |
| 2021/0130103 A1 * | 5/2021 | Seo | B65G 39/125 |

FOREIGN PATENT DOCUMENTS

| | | |
|---|---|---|
| JP | 5451200 B2 | 3/2014 |
| KR | 20150136928 A | 12/2015 |

OTHER PUBLICATIONS

International Search Report dated Apr. 11, 2023 for corresponding International Application No. PCT/EP2022/085220, filed Dec. 9, 2022.

Written Opinion of the International Searching Authority dated Apr. 11, 2023 for corresponding International Application No. PCT/EP2022/085220, filed Dec. 9, 2022.

French Search Report dated Aug. 2, 2022 for corresponding French Application No. 2113938, filed Dec. 19, 2021.

\* cited by examiner

DEVICE FOR LATERALLY GUIDING AN ENDLESS CONVEYOR BELT OF A TROUGH CONVEYOR

CROSS-REFERENCE TO RELATED APPLICATIONS

This Application is a Section 371 National Stage Application of International Application No. PCT/EP2022/085220, filed Dec. 9, 2022, and published as WO 2023/110676 A1 on Jun. 22, 2023, not in English, which claims priority to French Patent Application No. 2113938, filed Dec. 19, 2021, the contents of which are hereby incorporated by references in their entireties.

TECHNICAL FIELD

The present invention relates to the technical field of "trough conveyors" comprising an endless conveyor belt which is deformable so as to form a trough. In this technical field, the invention relates more particularly to the lateral guidance of the trough-shaped conveyor belt.

PRIOR ART

Trough conveyors have been known and used for many years for "bulk" conveying, i.e. for conveying any type of bulk product or object, or any type of bulk material, from one point to another. The purpose of the trough shape is to prevent bulk objects, products or materials from falling off the side of the conveyor belt as they are conveyed.

An endless conveyor belt of a trough conveyor is deformable so as to form a trough. This is the case, for example, in the trough conveyors described in publications U.S. Pat. Nos. 2,695,701, 4,720,005 and 6,269,994.

To guide the carrying run of the endless belt of a trough conveyor, there are two types of rotating guide roller, of the idle roller type.

A first type of guide roller described, for example, in European patent application EP1564166 is a guide roller that is horizontal and positioned centrally under the carrying run of the conveyor belt, the axis of rotation of the roller being perpendicular to the longitudinal conveying axis of the conveyor. In European patent application EP1564166, this guide roller is retractable via rotation between a position in which it supports and guides the conveyor belt and a retracted position in which it is no longer in contact with the conveyor belt.

A second type of idle roller, described for example in the trough conveyors of the aforementioned publications U.S. Pat. Nos. 2,695,701, 4,720,005 and 6,269,994, is a lateral guide roller, which is inclined or can be inclined at a certain angle, and which makes it possible to laterally guide one of the two raised lateral parts of the trough formed by the carrying run of the conveyor belt. The greater the inclination of this type of guide roller, the greater the depth of the trough formed by the conveyor belt, which in practice allows a greater volume of bulk to be conveyed per linear meter.

The guide roller is typically mounted on a support in a removable manner in order to allow maintenance.

When the endless conveyor belt of a trough conveyor is deformable so as to form a trough, these guide rollers not only have a lateral guiding function but also, depending on their positioning on the path of the conveyor belt, a trough-forming or trough-maintaining function.

Trough-forming guide rollers are mounted in a station upstream of the conveyor, where they support and guide the conveyor belt while deforming it from its initial (unconstrained), substantially flat shape into its final, trough shape as it leaves the trough-forming station.

The terms "upstream" and "downstream" are defined here in relation to the direction of travel of the carrying run of the conveyor belt.

Lateral guide rollers, positioned on the path of the conveyor belt downstream of the trough-forming station, serve to guide and merely hold the conveyor belt in a trough shape.

In some cases, a horizontal guide roller of the aforementioned first type can be positioned between two lateral guide rollers of a pair. In other embodiments, it is possible not to place a guide roller of the first type between two lateral guide rollers.

As has already been explained, in a trough conveyor, once the conveyor belt has been assembled, removing a lateral guide roller from its support and mounting it again is complicated and very time-consuming because of the pressure exerted by the conveyor belt on the guide roller due to it being tensioned, even when there is no bulk on the conveyor belt. This pressure is all the greater and more problematic the more the conveyor belt is deformed or kept deformed by the guide roller.

Thus, currently, in order to mount or remove a lateral guide roller without having to slacken the belt, at least one person has to reduce the pressure exerted by the conveyor belt on the guide roller, for example by moving the conveyor belt away from the guide roller by means of a bar used as a lever, while another person mounts or removes the lateral guide roller. In addition to the difficulty of the operation, it is stressed that at least two people are needed for mounting or removal, and there is a risk of accidents with the mounting/removal operation.

In some cases, the pressure exerted by the conveyor belt on the guide roller is too great, thereby making it necessary, undesirably, to completely dismantle the device (support and lateral guide roller) and/or slacken the conveyor belt.

Another problem is the difficulty in accessing a lateral guide roller during a removal operation. This difficulty is further exacerbated by the generally mandatory presence of entry point protection.

An attempt has already been made to facilitate the removal or mounting of lateral guide rollers on a trough conveyor by proposing the use of an inflatable jacket which is positioned between the conveyor belt and a bearing point proximate to the guide roller, and which is inflated so as to move the conveyor belt away from the guide roller.

This solution might seem attractive at first glance, but it entails other drawbacks. In particular, it can be difficult to access a bearing point suitable for the use of this inflatable jacket. In addition, and especially with this solution, each maintenance team has to be provided with additional equipment (compressor and bulky inflatable jacket), which has to be transported to the trough conveyor for each maintenance operation on a lateral guide roller.

Japanese patent JP5451200 and Korean patent application KR20150136928 also propose a technical solution involving an improved support for a lateral guide roller in a trough conveyor. This improved support comprises a pivoting arm which, in an operational position, supports the lateral guide roller at an upper point and is rotatable between said operational position and a retracted position.

In the technical solution described in Japanese patent JP5451200 or in Korean patent application KR20150136928, in order to retract said pivoting arm, the lateral guide roller is moved, in a first step, upward to disengage it from this pivoting arm so that, in a second step, it is possible to retract the pivoting arm by pivoting it downward. Handling of the guide roller during mounting or removal thus remains a time-consuming and accident-prone operation which requires at least two people in practice.

In addition, as already pointed out, the conveyor belt exerts considerable pressure on the guide roller due to it being tensioned, even when there is no bulk on the conveyor belt, thereby making it very difficult to move the lateral guide roller upward. The drawback in practice is that the lateral guide roller has to be removed or mounted without a conveyor belt, or with a conveyor belt that is sufficiently slack.

OBJECT OF THE INVENTION

An object of the invention is to provide a novel technical solution that completely simplifies the operations of mounting and removing a lateral guide roller in a trough conveyor in the presence of an endless conveyor belt that exerts pressure on the lateral guide roller, while avoiding the need for additional special equipment to carry out the mounting/removal of the lateral guide roller.

SUMMARY OF THE INVENTION

This object is achieved by means of a lateral guide device for laterally guiding an endless conveyor belt of a trough conveyor, the support of the guide roller of which has been improved.

According to a first aspect, one subject of the invention is thus a lateral guide device which comprises, in a manner known in the prior art, a support and an idle guide roller which is able to be mounted in a removable manner on the support between a first part that makes it possible to support, in an operational position, a first end of the axle of the roller at an upper point and a second part that makes it possible to support a second end of the axle of the roller at a lower point; the first part of the support is movable between said operational position and a retracted position; the lateral guide device comprises a locking means which makes it possible to lock the first part of the support in said operational position; once the first part is locked in said operational position and the roller is mounted on the support, the first part can be unlocked and can be completely disengaged from the first end of the axle of the roller and brought into said retracted position.

Characteristically according to the invention, the support comprises a retaining element which, when the first part of the support is brought into the retracted position and does not support the roller, has the function of vertically retaining the roller in a removal position in which the second end of the axle of the roller is supported at the lower point by the second part of the support.

Optionally according to the invention, the lateral guide device of the invention can also comprise the optional technical features hereinafter, taken in isolation or in combination:

When the first part of the support is brought into a retracted position and does not support the roller, the roller is able to pivot downward under the effect of gravity, while being supported at the lower point by the second part of the support, and the retaining element has the function of vertically retaining the roller in said removal position when the roller pivots downward.

The first part of the support is not detached from the rest of the support (i.e. it remains attached to the rest of the support) when it is retracted.

In said retracted position of the first part of the support, the roller is completely axially accessible, and preferably can be axially removed from the second part of the support.

The support comprises a rotatable hinge that allows the first part of the support to pivot between said operational position and said retracted position.

The hinge allows the first part of the support to pivot over an angular range of at least 60°.

The support comprises a third, connecting part which rigidly connects the first part to the second part and the first part of the support is movable relative to this third, connecting part for the movement thereof between said operational position and said retracted position.

The hinge is between the first part of the support and said third, connecting part.

The upper and lower points of the support define a support axis and the axis of rotation of the hinge of the first part of the support is horizontal and transverse to this support axis, and preferably perpendicular to this support axis.

The retaining element is positioned under the roller when the latter is mounted on the support.

The retaining element is inclined upward from its end closest to the second part, and preferably has substantially the same inclination as the roller mounted on its support.

The retaining element is also able to laterally hold the guide roller in its removal position.

The retaining element comprises a retaining wall which is positioned under the roller when the latter is mounted on the support.

The retaining element comprises two lateral holding walls which form, together with the retaining wall, a trough for retaining and laterally holding the roller in its removal position.

In its removal position, the roller is held inclined upward from its lower point.

The lower and upper points of the support define a support axis, and the angle ($\alpha$) of downward tilting of the roller in its removal position relative to this support axis is strictly greater than 0° and less than or equal to 45°, and preferably between 5° and 20°.

The locking means comprises a clamping nut and a threaded pin attached to the support; the first part comprises an oblong through-opening which is positioned and oriented such that it allows the threaded pin to pass through the first part when the latter is brought into said operational position.

The device comprises at least one entry point protection element which is attached to a fixed part of the support, preferably removably, and which prevents access to the roller from at least one of its two main sides, said entry point protection element preferably comprising a rectangular plate of which the width is greater than the diameter of the roller and of which the length is greater than the length of the roller.

The support comprises a fixed bearing element and the locking means makes it possible to clamp the first part against this fixed bearing element.

The fixed bearing element comprises a centering element which is able to cooperate with a complementary centering element of the first part of the support so as to center the first part of the support when it is brought into said operational position and is locked by being clamped against the fixed bearing element.

The bearing element comprises a bearing plate, a bearing edge of which comprises a male centering element and the first part of the support comprises a centering through-opening which is preferably oblong in shape and which is dimensioned and oriented relative to the male centering element such that, when the first part of the support moves from its retracted position into its operational position, this centering opening is positioned facing the male centering element and the male centering element passes through the centering opening, thereby guiding and centering the first part of the support into its operational position bearing on the bearing edge of the bearing plate.

The first part of the support is able to be lowered relative to the roller from said operational position in which it supports the axle of the roller so as to be completely disengaged from the end of the axle of the roller without moving the roller upward and in particular without pivoting the roller upward.

The first part of the support is able to be moved relative to the roller into a retracted position in which the first portion of the support is not aligned with the end of the axle of the roller.

The first part of the support comprises a recess which is able to accommodate the first end of the axle of the roller when the first part of the support is in the operational position and to be completely disengaged from the first end of the axle of the roller when the first part of the support is moved relative to the roller so as to be brought into the retracted position without moving the roller upward and in particular without pivoting the roller upward.

The recess is able to allow the end of the axle of the roller to be inserted into the recess from above.

The recess is able to be completely disengaged from the first end of the axle of the roller by lowering the first part of the support relative to the roller from its operational position.

The recess has a U-shaped profile.

The first part of the support comprises an upper plate in which a notch is made to form said recess.

The first part of the support is able to be moved downward, from said operational position, while vertically retaining the roller which pivots downward under the effect of gravity, until the roller is blocked vertically in its removal position by the retaining element.

The support comprises a rotatable hinge that makes it possible for the first part of the support to pivot between said operational position and said retracted position and the rotatable hinge of the first part of the support is positioned under the roller between the first end and the second end of the axle of the roller, and preferably proximate to the first end of the axle of the roller supported by the first part of the support in said operational position.

The first part of the support comprises a main arm which is rotatably hinged and which is inclined outward from the roller and upward relative to the horizontal, at least when the first part of the support is in the operational position.

The arm is hinged so as to be able to pivot downward into a retracted position in which it is oriented substantially horizontally.

The retaining element is fixed relative to the second part of the support and the first part of the support is movable relative to the retaining element.

The first portion of the support is able to be completely disengaged from the first end of the axle of the roller by lowering the first portion of the support from said operational position in which it supports the roller and without moving the roller upward, in particular without pivoting the roller upward.

Another subject of the invention is a method for removing an idle guide roller from the aforementioned lateral guide device, which roller is mounted in contact with the carrying run of a trough-shaped conveyor belt of a trough conveyor, the carrying run exerting pressure on the idle guide roller and being locally deformed or kept locally deformed by said roller, said method comprising the following consecutive steps:
(a) the first part of the support is unlocked;
(b) this first part is retracted so as to release the end of the axle of the roller at the upper point, such that the roller remains supported at its other end at the lower point of the support and is held vertically by the retaining element of the support in a removal position;
(c) the roller is removed from its support, preferably by pulling it in its axial direction in order to completely disengage its end at the lower point from the second part of the support.

Preferably, in step (b), the roller pivots downward under the effect of gravity until it is held vertically by the retaining element of the support in said removal position.

Preferably, in step (b), the first part of the support is retracted in such a way that the first part of the support retains the roller vertically, the roller pivoting downward under the effect of gravity, until the roller is blocked vertically in its removal position by the retaining element.

Preferably, in step (b), the first part of the support is retracted without moving the roller upward and in particular without pivoting the roller upward.

Another subject of the invention is a method for mounting an idle guide roller of the aforementioned lateral guide device, the support of which is already mounted in a trough conveyor comprising a trough-shaped conveyor belt which is deformable so as to form a trough or be kept as a trough, said method comprising the following consecutive steps:
(a) with the first part of the support retracted, the roller is positioned relative to the support and moved so as to position one end of the axle of the roller on the second part of the support so that it is supported at a lower point, the roller being retained vertically by the retaining element of the support;
(b) the roller is lifted by pivoting it upward so as to bring it into contact with the carrying run of the conveyor belt;
(c) the first part of the support is brought into its operational position and it is locked in this position;
(d) the other end of the axle of the roller is positioned on the second part of the support so that it is supported at an upper point.

Preferably, in mounting step (b), the roller is pivoted upward using a lever and by using the retaining element as the fulcrum of this lever.

According to a second aspect, the invention also relates to a lateral guide device for laterally guiding an endless conveyor belt of a trough conveyor, the device comprising a support and an idle guide roller which is able to be mounted in a removable manner on the support between a first part that makes it possible to support, in an operational position, a first end of the axle of the roller at an upper point and a second part that makes it possible to support a second end of the axle of the roller at a lower point; the first part of the support is movable between said operational position and a retracted position in which the first part of the support is completely disengaged from the end of the axle of the roller; the lateral guide device comprises a locking means which makes it possible to lock the first part of the support in said operational position.

Characteristically according to the invention, the support comprises a fixed bearing element and the locking means makes it possible to clamp the first part against this fixed bearing element; the fixed bearing element comprises a centering element which is able to cooperate with a complementary centering element of the first part of the support so as to center the first part when it is brought into said operational position and is locked by being clamped against the fixed bearing element.

Optionally according to this second aspect of the invention, the lateral guide device can also comprise the aforementioned optional technical features of the lateral guide device according to the aforementioned first aspect, which optional technical features can be taken in isolation or in combination.

Another subject of the invention is a method for removing an idle guide roller from a lateral guide device according to the aforementioned second aspect, which roller is mounted in contact with the carrying run of a trough-shaped conveyor belt of a trough conveyor, the carrying run exerting pressure on the idle guide roller and being locally deformed or kept locally deformed by said roller, said method comprising the following consecutive steps:
  (a) the first part of the support is unlocked;
  (b) this first part is retracted so as to release the end of the axle of the roller at the upper point and to disengage the centering element of the fixed bearing element from the complementary centering element of the first part of the support;
  (c) the roller is removed from its support, preferably by pulling it in its axial direction in order to completely disengage its end at the lower point from the second part of the support.

Another subject of the invention is a method for mounting an idle guide roller of the lateral guide device according to the aforementioned second aspect, the support of which is already mounted in a trough conveyor comprising a trough-shaped conveyor belt which is deformable so as to form a trough or be kept as a trough, said method comprising the following consecutive steps:
  (a) with the first part of the support retracted, the roller is positioned relative to the support and moved so as to position one end of the axle of the roller on the second part of the support so that it is supported at a lower point of the support;
  (b) the roller is lifted by pivoting it upward so as to bring it into contact with the carrying run of the conveyor belt;
  (c) the first part of the support is brought into its operational position by centering it by means of the complementary centering elements and it is locked in this position;
  (d) the other end of the axle of the roller is positioned on the second part of the support so that it is supported at an upper point of the support.

Another subject of the invention is a lateral guide assembly for laterally guiding an endless conveyor belt of a trough conveyor, which assembly defines a central conveying axis and comprises at least one pair of lateral guide devices, wherein at least a first device is a lateral guide device of the invention and the second lateral guide device might or might not be a device of the invention; in this assembly, said first and second lateral guide devices are positioned on either side of the central conveying axis, at a distance from one another, the lower point of the support of the first device being closer to this central conveying axis than the upper point of its support.

Preferably, said second device is also a lateral guide device of the invention, and the lower point of the support of the second device is closer to this central conveying axis than the upper point of its support.

Preferably, both lateral guide devices are mounted on the same crossmember.

Another subject of the invention is a trough conveyor comprising a conveyor belt, which is deformable so as to form a trough, and one or more lateral guide devices of the invention or one or more lateral guide assemblies of the invention.

Another subject of the invention is the use of the aforementioned trough conveyor for bulk conveying

BRIEF DESCRIPTION OF THE FIGURES

The features and advantages of the invention will become more fully apparent on reading the detailed description hereinbelow of one preferred variant of the invention, which detailed description is given by way of non-limiting and non-exhaustive example of the invention and with reference to the accompanying drawings, in which.

DETAILED DESCRIPTION

Figure 1:
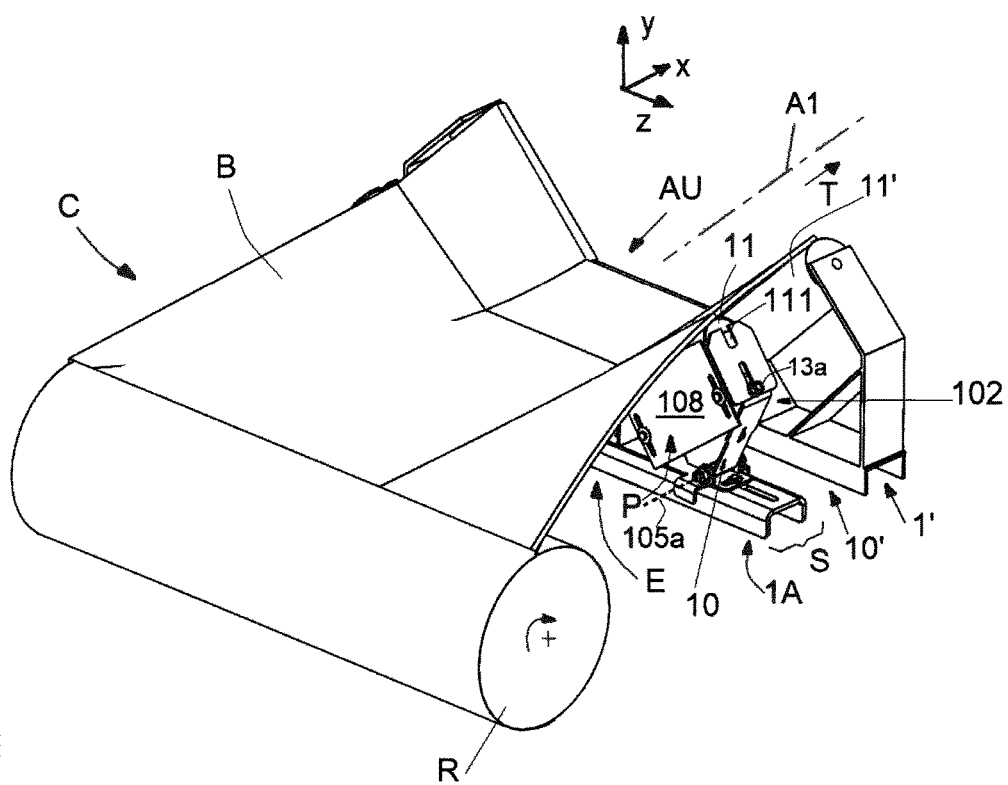
FIG. 1 is an isometric perspective view showing the upstream part of a trough conveyor of which the conveyor belt has been formed into a trough by means of lateral guide devices, the first of which conforms to one preferred embodiment of the invention and forms part of a lateral guide assembly with two rollers, only one roller of which is visible in FIG. 1.

FIG. 1 shows the upstream part of a trough conveyor C comprising:
  an upstream trough-forming station S formed by a unitary lateral guide assembly E comprising two lateral guide devices 1A and 1B, which are constructed in accordance with one preferred variant of the invention, of which only one lateral guide device 1A is visible in FIG. 1,
  and, at the exit of the trough-forming station S, a second lateral guide device 1', known in the prior art, which maintains the trough shape of the carrying run of the conveyor belt B. This second device could also have been a lateral guide device of the invention The main contribution of the invention lies in the novel structure of the support 10 for the guide roller 11 of the device 1A.

Trough Conveyor—FIG. 1—Lateral Guide Devices 1A and 1B (Invention) and 1' (Prior Art)

This trough conveyor C is typically used to convey "bulk" from one point to another, i.e. any type of bulk product or material (for example and not exhaustively: powders, granular materials, waste, etc.) or bulk objects, and can be used in any type of industry (for example and not exhaustively: food processing, civil engineering, manufacturing and production of road surfaces, waste treatment, agriculture, etc.).

The trough conveyor C shown in FIG. 1 comprises an endless conveyor belt B, which can be deformed so as to form a trough AU. Conventionally, this conveyor belt B is deflected around an upstream deflection drum R and around a downstream deflection drum (not shown) and tensioned between these two deflection drums. Other rollers, in particular tension adjustment rollers, can also be used on the return run (lower run), as needed. One of the two deflection drums is motorized and drives the conveyor belt in a known manner, while the other deflection drum is idle-mounted and rotated by friction with the conveyor belt.

FIG. 1 shows only the upstream part of the carrying run of the conveyor belt, which is in contact with guide rollers 11 and 11' of the lateral guide devices 1A and 1'. The deflection of the conveyor belt around the roller R is not shown.

In FIG. 1, the endless conveyor belt B defines a longitudinal conveying axis A1 and its carrying run, which is used for bulk conveying, is driven in the conveying direction T. Only the guide rollers of the devices 1A and 1' are visible on one of the sides of the conveyor belt B, although the carrying run is deformed similarly on its opposite side, preferably substantially symmetrically relative to the longitudinal conveying axis A1, by means of lateral guide devices 1B (FIG. 2) and 1' which are positioned in contact with the other side, relative to the conveying axis A1, of the carrying run of the conveyor belt B.

In the trough-forming station S, the carrying run is formed into a trough by the inclined rollers 11 of the lateral guide devices 1A and 1B (1B not visible in FIG. 1) in order to transition from an unconstrained substantially flat initial shape to a constrained trough shape. On leaving the trough-forming station S, this carrying run of the conveyor belt B is kept in shape by a series of subsequent pairs of lateral guide devices, such as lateral guide device 1' for example, which are judiciously distributed and spaced apart along this path, up to the delivery point for the bulk. In FIG. 1, the lateral guide devices after the one referenced 1' are not shown, and can advantageously be lateral guide devices in accordance with the invention; the device 1' of FIG. 1 can also be replaced with a device of the invention.

Generally, but not exclusively, the conveyed bulk is delivered to the downstream drive drum under the effect gravity as a result of the change in direction of the carrying run. Before reaching this downstream drive drum, the carrying run is no longer constrained and returns to its original flat shape. In practice, for the carrying run to transition from the trough shape to the flat shape, an assembly of the invention similar to that E used in the trough-forming station S, for example, is used as the last pair of lateral guide rollers.

For the purposes of this invention, the trough conveyor can comprise only lateral guide devices in accordance with the invention, or it can comprise lateral guide devices in accordance with the invention and conventional guide devices such as 1' of FIG. 1.

It will be understood from FIG. 1 that the conveyor belt, due in particular to its tensioning and deformation by the lateral guide rollers 11, 11', exerts a significant pressure on these rollers 11, 11', thereby making the removal of the guide roller 11' from its support 10', and the mounting thereof on its support 10', difficult and time-consuming for the devices 1' of the prior art. In addition, access to the roller 11' for the removal thereof is difficult, even more so when the device comprises an entry point protection element P such as that of the lateral guide device 1A of FIG. 1.

The novel lateral guide device of the invention, of which one preferred and non-limiting variant will now be described with reference to FIGS. 2 and 3, advantageously makes it possible to completely simplify the operations of mounting and removing a lateral guide roller of a trough conveyor with a view to the maintenance thereof, in particular the checking, cleaning, repair or replacement thereof.

Figure 2:
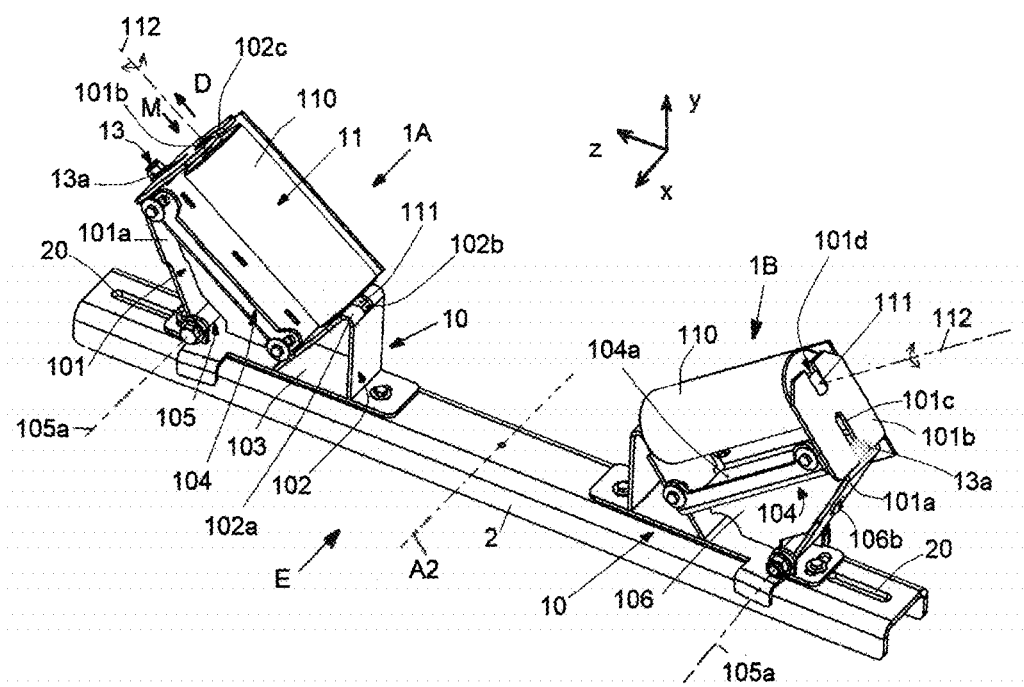
FIG. 2 is an isometric perspective view of the two-roller lateral guide assembly shown in FIG. 1, in its operational state, with the support associated with each roller locked.
Figure 3:
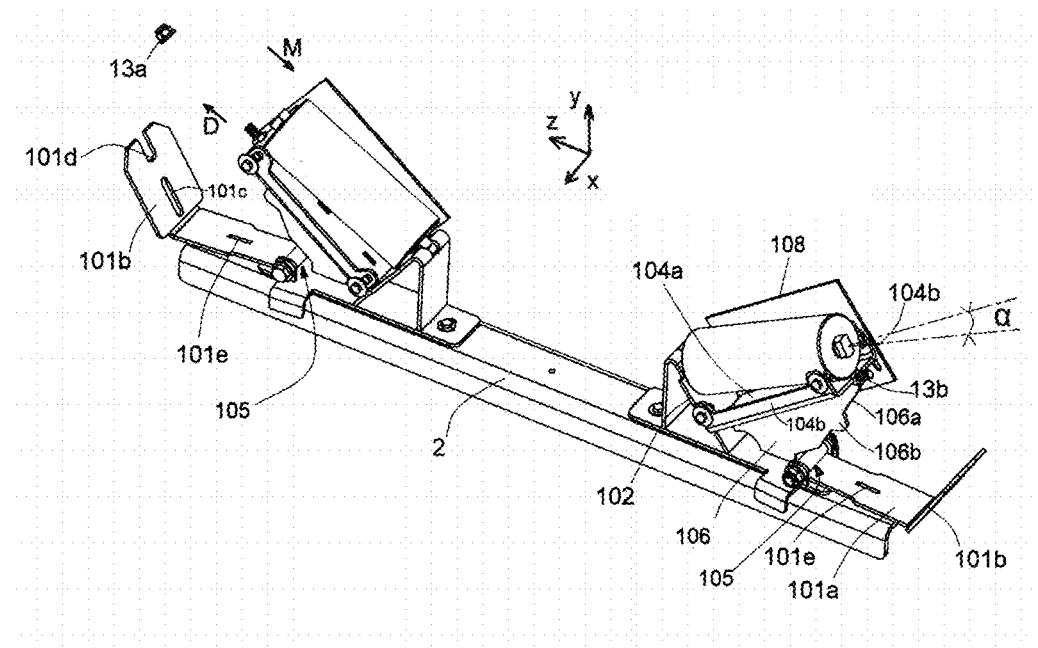
FIG. 3 is an isometric perspective view showing the lateral guide assembly of FIG. 2, one of the support parts which is associated with each idle guide roller being unlocked and having been retracted so as to completely release the end at the upper point of the axle of the rollers, both rollers having pivoted under the effect of gravity into their removal position in which they are, in this preferred variant, each retained vertically by a retaining element and are completely accessible and can be very easily removed from their support.

FIG. 2 and FIG. 3—Preferred Variant—Assembly E of Two Lateral Guide Devices 1

FIG. 2 shows the lateral guide assembly E for trough conveyors of FIG. 1, which defines a central conveying axis A2 and comprises two lateral guide devices 1A and 1B, each corresponding to a preferred variant.

Each device 1A and 1B comprises a support 10 and a guide roller 11, which is an idle roller.

Idle rollers 11 are well known and have already been implemented in devices of the prior art, in particular such as that 1' of FIG. 1.

As a simple reminder, an idle roller 11 can comprise a roller 110 which is idle-mounted on a shaft that runs through the roller 110, or on two aligned shaft ends positioned at either end of the roller 110.

In this text, the terms:

"axle" of the idle guide roller 11 refers either to a shaft that passes through the roller 110 or to the two aligned shaft ends at the ends of the roller 110, and "axis of rotation" of the idle guide roller 11 refers to the imaginary axis of rotation (FIG. 2—axes of rotation 112) of the roller 110 on its "axle".

The support 10 defines an upper support point and a lower support point for the axle of the roller 11, which are referred to here as the "upper point" and "lower point", respectively, and which are aligned along an axis, referred to here as the "support axis".

When the roller 11 is mounted on the support 10, it is inclined while being supported between the upper and lower points of the support 10 and its axis of rotation 112 is parallel to this support axis.

The lateral guide devices 1A and 1B are positioned on either side of the central conveying axis A2 of the assembly E, at a distance from one another, with the lower point of their support 10 closer to this central conveying axis A2 than the upper point of its support (10), which is further away therefrom.

The support axis of the lateral guide devices 1A and 1B is oriented transversely to this central conveying axis A2 and forms, together with this central conveying axis A2, an angle of 90° or a larger or smaller angle within an angular range around 90°, which preferably adjustable (e.g. over an angular range of +/−10° around) 90°.

In this preferred example, the two devices 1A and 1B are identical and symmetrical to one another relative to the plane (XY) and are at an angle of 5° relative to the perpendicular of the central conveying axis A2 of the assembly E.

In FIG. 2, both devices 1A and 1B are in their operational state, and can laterally guide and form or maintain the trough shape of the aforementioned conveyor belt B (FIG. 1).

In FIG. 3, the rollers 11 of both devices 1A and 1B are in their removal position (i.e. ready to be removed from their support 10) in which they are easily accessible and can easily be removed from their support 10.

In the following, reference is mainly made to the device 1A, although the description and explanations are of course transposable to the twin device 1B.

Support 10

In FIG. 2, the lateral guide roller 11, hereinafter referred to as "roller" for the sake of simplicity, is mounted in a removable manner on its support 10 and is inclined, in this case by an angle of approximately 35°. This value is of course not limiting for the invention, and the support 10 can easily be modified on a case-by-case basis to obtain a different angle of inclination, depending on the desired depth of the trough shape AU (FIG. 1).

In addition, the support 10 can be modified to allow different angles of inclination of the roller 11 for the same support.

This support 10 can, for example, be made of galvanized or stainless steel, and comprises two support elements 101 and 102 which constitute a first part and a second part of the support 10, respectively, and which are fixed to a plate 103. This plate 103 constitutes a third part of the support 10 and makes it possible to rigidly connect the two support elements 101 and 102 so as to form a unitary (i.e. one-piece) support 10.

The support 10 also comprises a retaining element 104 which will be described later on.

The two support elements 101 and 102 and the plate 103, which will now all be described in more detail, can advantageously be produced by simply cutting and bending a flat metal sheet, thereby facilitating the manufacture thereof (no assembly) and giving them excellent mechanical strength. The result is a sturdy support 10 that can reliably withstand, over a long period of time, the forces transmitted by the ends of the axle of the roller 11 as a result of the pressure exerted on the roller 11 by the conveyor belt.

Fixed Support Element (102)

Preferably, the support element 102 is a metal sheet folded into a V-shape which is welded to the plate 103.

This support element 102 comprises a cutout 102b which is made in its fold 102a, and which makes it possible to accommodate and support one of the two ends 111 of the axle of the roller 11 at the lower point.

In this preferred example, the geometry and dimensions of this cutout 102b are matched to those of the end 111 of the axle of the roller such that this axle end 111 can be inserted without force, from above, into the cutout 102b, and that once this axle end 111 has been inserted:

The axle of the roller 11 bears vertically on the support element (i.e. lower point),
The axle of the roller 11 is prevented from rotating in a plane perpendicular to its axis of rotation 112;
The axle of the roller 11 is prevented by the support element 102 from moving in translation axially downward (axis 112) and in the mounting direction M (FIG. 3).
When the roller 11 is released from the other support element 102, it can freely pivot downward under the effect of gravity (i.e. under its own weight) and is not prevented from moving in translation axially (axis 112) in its removal direction D (FIG. 3).

The main point is that the primary function of this support element 102 is to support the end 111 of the axle of the roller 11 at a lower point. The invention is not limited to this particular structure for element 102 which can, more generally, be replaced with any equivalent means, with a different structure, which fulfills the same function of bearing one end 111 of the axle of the roller 11 at a lower point.

Mobile Support Element 101

The other support element 101 is also made from a cut and folded metal sheet. It comprises a main arm 101a which extends, via a folding angle, into an upper plate 101b.

At its lower end, the arm 101a is connected to the plate 103 by a rotatable hinge 105, which allows it to pivot about an axis of rotation 105a relative to the plate 103.

Preferably, this rotatable hinge 105 allows the support element 101 to pivot over an angular range of at least 60° so as to provide maximum access to the roller 11 when the support element 101 is in the retracted position (FIG. 3).

More particularly, the rotatable hinge 105 is positioned under the roller 11, between the two ends 111 of the axle of the roller 11, and preferably proximate to the end 111 of the axle of the roller 11 which is supported by the support element 101 in said operational position, which notably makes it possible to reduce the lever arm between this hinge 105 and the force exerted by the weight of the roller 11 on the first part 101 of the support 10.

In particular, the hinged main arm 101a is inclined outward from the roller and upward relative to the horizontal, at least when the support element 101 is in its operational position (FIG. 2).

More particularly, in the particular example of FIG. 3, the arm 101a is advantageously hinged so as to be able to pivot downward into a retracted position in which it is oriented substantially horizontally.

The upper plate 101b of the support element 101 comprises a recess formed, in this particular example, by a U-shaped notch 101d, which is made in its upper edge (see device 1B-FIG. 1) and which makes it possible, when the support element 101 is locked in its operational position of FIG. 3, to accommodate and support an end 111 of the axle of the roller 11 at the upper point.

In the particular example of FIG. 3, the first part 101 of the support 10 is able to pivot downward into a retracted position in which the support element 101 is not aligned with the corresponding end 111 of the axle of the roller 11 and, more particularly in this example, in which the recess 101d is not aligned with the corresponding end 111 of the axle of the roller 11.

The geometry and dimensions of this notch 101d are matched to those of the end 111 of the axle of the roller such that this axle end 111 can be inserted without force, from above, into the notch 101d, and that once this axle end 111 has been inserted:

The axle of the roller 11 bears vertically on the support element 101 (i.e. upper point),
The axle of the roller 11 is prevented from rotating in a plane perpendicular to its axis of rotation 112;
The axle of the roller 11 is prevented by the support element 101 from moving in translation axially upward (axis 112) and in the removal direction D (FIG. 2).

The main point is that the primary function of this support element 101 is to support the end 111 of the axle of the roller 11 at an upper point.

The invention is not limited to this particular structure for element 101 which can, more generally, be replaced with any equivalent means, with a different structure, which more generally is movable between a lockable operational position and a retracted position and which, once locked in this operational position, can support an end 111 of the axle of the roller 11 at an upper point.

The upper and lower points of the support 10 are aligned along an axis, referred to here as the "support axis". When the roller 11 is mounted on the support 10, its axis of rotation 112 is parallel to this support axis.

In the preferred example of FIGS. 1 and 2, the axis of rotation 105a of the element 101 is horizontal and transverse, and preferably perpendicular, to this support axis, i.e. in practice to the axis of rotation 112 of the roller 11, when roller 11 is mounted on the support 10. Thus, advantageously in its retracted position of FIG. 3, the support element 101 does not occupy any space on either side of the device 1A.

Locking/Unlocking the Support Element 101

Each adjusting device 1A (1B) comprises means 13 for locking the support element 101 in its operational position of FIG. 2.

More particularly, in the preferred exemplary embodiment of the accompanying figures, this locking means 13 comprises a nut 13a and a threaded pin 13b (of the threaded rod type) which is integral with the support 10 and, more particularly in this example, is attached to the retaining element 104.

In the absence of a retaining element 104, the threaded pin 13b can be attached to any fixed point on the support 10.

The plate 101b of the support element 101 comprises an oblong through-opening 101c (FIG. 3) which is positioned and oriented such that it allows the threaded pin 13b to pass through the plate 101b when the support element 101 pivots into said operational position of FIG. 2.

In addition, the support 10 comprises a bearing plate 106 which is attached, for example by welding, between the retaining element 104 and the plate 103.

This bearing plate 106 has been cut out in such a way that one of its edges 106a (bearing edge) comprises a recess 106b, constituting a male centering element.

The arm 101a of the element 101 comprises an oblong centering through-opening 101e which is dimensioned and oriented relative to the male centering element 106b such that, as the support element 101 pivots from its retracted position of FIG. 3 into its operational position of FIG. 2, this opening 101e in the plate 101b is positioned facing the centering element 106b.

As it continues to pivot, the centering element 106b passes through the opening 101e, allowing the support element 101 to be guided into its operational position (FIG. 2), in which it bears on the bearing edge 106a of the plate 106, and to be aligned perfectly with the other, fixed support element 102.

Once pivoted into this operational position of FIG. 2, the support element 101 is correctly centered, with the upper point of the support element 101 correctly aligned with the lower point of the other, fixed support element 102.

The support element 101 can then be easily locked in this operational position by threading the nut 13a onto the threaded pin 13b and tightening this nut 13a sufficiently to reliably prevent the support element 101 from pivoting about the hinge 105 and to clamp the support element 101 in abutment against the bearing edge 106a of the bearing plate.

To unlock the support element 101 in order to retract it, the nut 13a is simply loosened and removed from the threaded pin 13b.

Retaining Element 104

In the particular example of the accompanying figures, the retaining element 104 of the support 10 is fixed relative to the support element 102.

The primary function of the retaining element 104 is to vertically retain the roller 11 in its removal position of FIG. 3 and prevent it from falling under its own weight.

In particular, when the roller 11 is mounted on the support 10, the retaining element 104 is positioned under the roller 11 and is at a distance from the roller 11.

Preferably, the retaining element 104 is centered with respect to the roller 11 mounted on the support 10.

In the variant of the accompanying figures, the retaining element 104 also has the additional function of laterally holding the roller 11 in its removal position.

More specifically, in the particular example of FIGS. 2 and 3, the retaining element comprises a U-shaped profile with a base forming a retaining plate 104a and two lateral holding walls 104b. It thus forms a basin for retaining and laterally holding the roller 11 in its removal position.

The retaining element 104 is attached by its base to the upper edge of the bearing plate 106 and one of its ends is attached to the fixed support element 102 and 103, for example by welding (FIG. 3)

This retaining element 104 is preferably inclined upward from its end closest to the support element 102, and even more preferably has substantially the same inclination as the support axis of the support 10, in other words the same inclination as the roller 11 mounted on its support 10.

The inclination of the retaining element 104 and its distance from the roller 11 are preferably chosen such that:
  in its removal position, the roller 11 is held inclined upward from its lower point, thereby preventing it from accidentally slipping and falling when not held during a mounting or removal operation, and/or
  the angle of tilting ($\alpha$) (FIG. 3) of the roller 11 in its removal position relative to this support axis can be very small and between 0° (not inclusive) and 45°, and preferably between 5° and 20°.

The aforementioned minimum angle value of 5° is usually more than sufficient to ensure that the roller 11 is sufficiently distanced from the belt and no longer subjected to excessive pressure from the conveyor belt.

In the extreme, even if the roller 11 does not pivot at all ($\alpha$=0), removal would still be possible by taking the roller 11 out axially, since friction with the carrying run of the belt B remains low. It is therefore conceivable within the scope of the invention to have a roller 11 that does not pivot under the effect of gravity when its axle end 111 at the upper point is released, for example either because the support at its other axle end 111, opposite the lower point, vertically retains the roller 11 by holding it cantilevered or because a shim has been implemented between the roller and the retaining element, which holds the roller 11 and prevents it from pivoting downward.

The maximum angle value of 45° is recommended (but is not limiting) in order avoid the tilting of the roller 11 from being too great and to prevent the roller 11 from accidentally "bouncing" off this retaining element 104 when the roller 11 is not held in place as it tilts.

In the variant of FIGS. 2 and 3, the holding walls 104b and the retaining wall 104a are integral parts of the same piece (U-shaped profile). In another variant, it is possible for the retaining element 104 not to be made in one piece, or even be unitary; for example, the retaining wall 104a and the holding walls 104b could be attached separately to a fixed part of the support 10.

Entry Point Protection P

Depending on its position in the conveyor, the device 1A or 1B of the invention can be fitted with at least one entry point protection element P which is attached to the support 10, to a fixed part of this support 10, and for example to the retaining element 104. In a known manner, the entry point protection element P prevents access to the roller 11 from at least one of its two sides [upstream side of the roller relative to the direction of travel of the belt in order to prevent pinching between the belt and the roller].

In the invention, to avoid wasting time on unnecessary removal and remounting, it advantageously remains in place for the duration of the operation on the trough conveyor, during operations of mounting or removing a roller 11.

It should be emphasized that, by virtue of the invention, keeping the entry point protection element is not detrimental when it comes to accessing the roller 11 because of the accessibility of the roller 11 that is obtained, in the invention, by virtue of the retraction of the support element 101.

This entry point protection element P is preferably removable from the support 10 so that it is possible to adjust its positioning on one side or the other of the support 10 in order to take account of the direction of travel of the carrying run of the endless belt B relative to the rollers 11.

The positioning of this entry point protection element P on the support 10 is preferably adjustable so that its operating clearance with the belt can be set.

This entry point protection element P is obtained, for example, by means of a rectangular plate 108 (FIG. 1) of which the width is greater than the diameter of the roller 11 and of which the length is greater than the length of the guide roller.

Assembly E Under the Carrying Run of the Conveyor Belt B

This lateral guide assembly E is unitary, i.e. one-piece.

More specifically, and without limiting the scope of the invention, the assembly E comprises a crossmember 2 on which the supports 10 of the two devices 1A and 1B are mounted and to which they are attached, for example by bolting. The distance between the supports 10 of the two devices 1A and 1B on the crossmember 2 is preferably adjustable.

To position the assembly E (without the 11 rollers) on a supporting structure under the carrying run of the B conveyor belt and attach it to said structure, the conveying axis A2 of the assembly E and the aforementioned conveying axis A1 (FIG. 1) of the trough conveyor just have to be aligned in the same vertical plane, thereby centering the supports 10 relative to the conveying axis A1 of the conveyor.

The operations of mounting a roller 11 on and of removing same from its support 10 in the presence of the conveyor belt B will now be described.

Operation of Mounting a Roller 11

It is assumed that support element 101 is locked in its operational position of FIG. 2 but is not supporting a roller 11.

To mount a roller 11 on this support 10, just the following consecutive steps have to be carried out.

The support element 101 is unlocked by loosening and removing the clamping nut 13a from the threaded pin 13b.

This support element 101 is pivoted into its retracted position of FIG. 3.

The roller is positioned relative to the support element 10 and moved so as to insert one end 111 of the axle of this roller 11 into the cutout 102b in the support element 102.

The roller 11 can then advantageously be released, and it is then in the removal position of FIG. 3, bearing on the lower point of the support 10.

The roller 11 is lifted by pivoting it slightly upward so as to bring it into contact with the carrying run of the conveyor belt B.

This operation can advantageously be facilitated by using a bar which is inserted between the roller 11 and the retaining element 104, and by using this retaining element 104 as the fulcrum of a lever, which makes it easier to exert pressure on the roller 11 which is in contact with the conveyor belt, and easier to position its other end at sufficient height (i.e. slightly above the upper point of the support 10) by pushing the carrying run of the conveyor belt back.

Alternatively, the operator can also lift the roller 11 without bearing on the retaining element 104 in order to push the conveyor belt back.

The support element 101 is then pivoted upward into its operational position and locked in this position by means of the nut 13a.

The pressure on the roller 11 can then be released in order to lower it slightly so that its axle end 111 at the upper point descends so as to enter the notch 101d in the plate 101b of the support element 101.

Preferably, the nut 13a is checked and, if necessary, tightened using a torque wrench.

This mounting operation can be carried out easily, quickly and without risk by a single person.

Operation of Removing a Roller 11

To remove a roller 11 from its support, just the following consecutive steps have to be carried out.

The support element 101 is unlocked by loosening and removing the clamping nut 13a from the threaded pin 13b.

From its operational position of FIG. 2, this support element 101 is pivoted downward into its retracted position of FIG. 3, which makes it very easy to release the end 111 of the axle of the roller at the upper point, which roller 11 pivots downward of its own accord merely under the effect of gravity (i.e. under its own weight), while still being supported (lower point) at its other end, and descends as far as the retaining element 104 which blocks it vertically in its removal position of FIG. 3.

More particularly, in this preferred exemplary embodiment, when the support element 101 is lowered from the operational position in which it supports the roller 11, it vertically retains the roller 11 in a first phase, and the roller pivots downward under the effect of gravity until the roller 11 is blocked vertically in its removal position by the retaining element 104, and then, in a second phase, in continuing the downward pivoting of the first part 101 of the support 10, the support element 101 is completely disengaged from the end 111 of the axle of the roller 11, which remains blocked vertically by the retaining element 104.

The support element 101 can thus advantageously be completely disengaged from the first end 111 of the axle of the roller 11 by lowering the first portion 101 of the support 10 from an operational position in which it supports the roller and without moving the roller 11 upward, in particular without pivoting the roller 11 upward.

In this removal position, the pressure exerted by the conveyor belt on the roller 11 is much lower than in the operational position of the roller. In addition, the roller 11 is easily accessible (FIG. 3) since the support element 101 no longer obstructs it by virtue of being retracted. It is then simply a matter of easily removing the roller 11 by pulling it in its axial direction in order to completely disengage its end 111 at the lower point from the support element 102.

This removal operation can be carried out easily, quickly and without risk by a single person.

The invention is not limited to the particular variant of the retaining element 104 of the accompanying figures.

In particular, it is conceivable within the scope of the invention to implement a roller 11 that does not pivot under the effect of gravity when its axle end 111 at the upper point is released, with the retaining element 104 having the function of vertically retaining the roller in the removal position without the latter pivoting downward, i.e. in a removal position in which the roller has not tilted downward.

In this variant, as previously described ($\alpha$=0), the retaining element 104 of the support 101 can, for example, be implemented with an added shim, which can be used and put in place for removal or mounting of the roller 11 by being inserted between the roller and the retaining element 104 and which can be removed once the roller has been removed from or mounted on the support 10.

Also in this variant, as previously described ($\alpha$=0), the retaining element 104 of the support 101 can also be formed by the part of the support element 102 which supports the axle of the roller 11 at the lower point and which is able to have sufficient bearing capacity to hold the roller 11 cantilevered in its removal position when the support element 101 is retracted and does not support the roller 11.

In another variant of the invention, the retaining element 104 can be movable relative to the support element 102 and capable of being moved into a retaining position in which it can vertically retain the roller 11 in its removal position when the support element 101 is retracted and does not support the roller 11.

In a further variant of the invention, the retaining element 104 of the support 10 can be a removable element of the support 10 which can be put in place for a removal operation or a mounting operation and which can, for example, be removed for the rest of the time.

It should also be emphasized that the device of the invention can easily be installed on all existing conveyor facilities using a trough conveyor, and in particular can advantageously replace existing lateral guide devices, such as that 1' of FIG. 1, as part of an operation to modernize existing trough conveyors, for example.

The invention is not limited to the preferred variant of the accompanying figures. The following non-exhaustive modifications can be made.

The support element 101 can be retractable by implementing another movement (e.g. translation) or a combination of movements (e.g. one or more translations and rotations) other than just rotation alone.

The rotatable hinge 105 is not necessarily between the support element 101 and the plate 103 but could, for example, be provided on the support element 101 itself, for example between the arm 101a and the upper plate 101b of this support element 101, such that it is the plate 101b which would be retractable by pivoting and would constitute "said first part of the support". In this case, it would also be necessary to modify the locking feature so that it is the plate 101b which is lockable to a fixed point on the support.

The support 10 can be designed in such a way that the support element 101 can be retracted by being detached from the rest of the support 10.

The support 10 can be modified to allow the inclination of the roller 11 to be adjusted.

The device of the invention does not necessarily form part of a unitary assembly, such as that E of the accompanying figures, since it is possible for the crossmember 2 not to be used and each device 1A, 1B can be independent of the other.

Preferably, when removing the roller 11, the first part 101 of the support 10 can advantageously be retracted without moving the roller 11 upward, and in particular without pivoting the roller 11 upward, which avoids exerting additional pressure on the conveyor belt B. Nevertheless, in another variant of the invention, the roller 11 can also be moved upward or pivoted upward, before the first part 101 of the support 10 is retracted, for example to disengage, when necessary, the axle of the roller 11 from the first part 101 of the support 10, for example by using a lever, such as a crowbar or the like, inserted between the roller 11 and the retaining element 104 and by using the retaining element 104 as the fulcrum for this lever in order to lift the roller 11.

Figure 4:
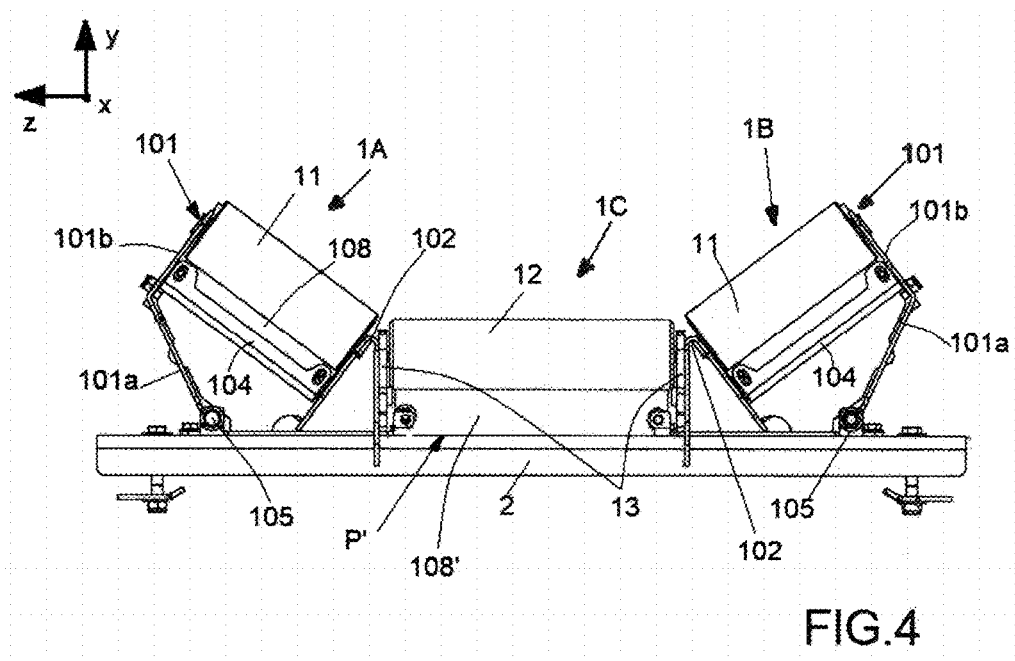
FIG. 4 shows a rear view of another variant of a guide assembly, with three rollers.
Figure 5:
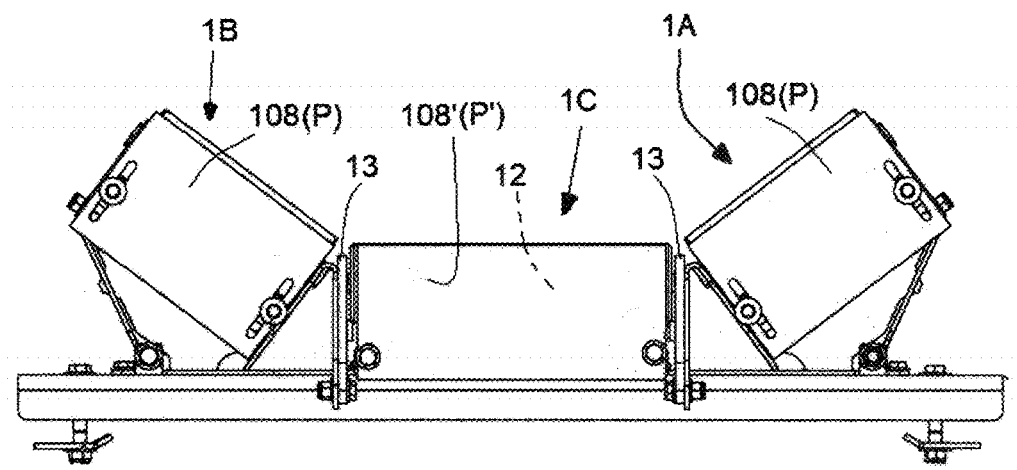
FIG. 5 shows a front view of the three-roller guide assembly shown in FIG. 3.

In the particular variant of FIGS. 4 and 5, in addition to the lateral guide devices 1A and 1B, the guide assembly comprises a central guide device 1C, mounted between the two lateral guide devices 1A and 1B. This central guide device 1C comprises a central, horizontal idle guide roller 12, which is supported at both ends by a support 13.

This central guide device 1C also comprises an entry point protection element P', preferably comprising a rectangular plate 108', which is attached to the supports 13 of the roller 12, of which the width is greater than the diameter of the roller 12 and of which the length is greater than the length of the roller 12.

The invention claimed is:

1. A lateral guide device for laterally guiding an endless conveyor belt of a trough conveyor, the device comprising:
a support;
an idle guide roller which is able to be mounted in a removable manner on the support between a first part that makes it possible to support, in an operational position, a first end of the an axle of the roller at an upper point and a second part that makes it possible to support a second end of the axle of the roller at a lower point, wherein the first part of the support is movable between said operational position and a retracted position; and
a lock which locks the first part in said operational position, and wherein once the first part is locked in said operational position and the roller is mounted on the support, the first part can be unlocked and can be completely disengaged from the first end of the axle of the roller and brought into said retracted position,
wherein the support comprises a retaining element which, when the first part of the support is brought into the retracted position and does not support the roller vertically retains the roller in a removal position in which the second end of the axle of the roller is supported at the lower point by the second part of the support.

2. The lateral guide device as claimed in claim 1, wherein, when the first part of the support is brought into thea retracted position in which the first part does not support the roller, the roller is able to pivot downward under the effect of gravity, while being supported at the lower point by the second part of the support, and the retaining element vertically retains the roller in said removal position when the roller pivots downward.

3. The lateral guide device as claimed in claim 1, wherein the first part of the support remains attached to the rest of the support when the first part is retracted.

4. The lateral guide device as claimed in claim 1, wherein, when the first part of the support is in said retracted position, the roller is completely axially accessible.

5. The lateral guide device as claimed in claim 1, wherein the support comprises a rotatable hinge, which enables the first part of the support to pivot between said operational position and said retracted position.

6. The lateral guide device as claimed in claim 5, wherein the hinge allows the first part of the support to pivot over an angular range of at least 60°.

7. The lateral guide device as claimed in any claim 1, wherein the support comprises a third, connecting part which rigidly connects the first part to the second part and wherein the first part of the support is movable relative to this third, connecting part for the movement thereof between said operational position and said retracted position.

8. The lateral guide device as claimed in claim 7, wherein the support comprises a rotatable hinge, and wherein the hinge is between the first part of the support and said third, connecting part.

9. The lateral guide device as claimed in claim 5, wherein the upper and lower points of the support define a support axis and an axis of rotation of the hinge of the first part of the support is horizontal and transverse to this support axis.

10. The lateral guide device as claimed in claim 1, wherein the retaining element is positioned under the roller when the roller is mounted on the support.

11. The lateral guide device as claimed in claim 1, wherein the retaining element is inclined upward from an end of the retaining element closest to the second part.

12. The lateral guide device as claimed in claim 1, wherein the retaining element laterally holds the guide roller in the removal position.

13. The lateral guide device as claimed in claim 1, wherein the retaining element comprises a retaining wall which is positioned under the roller when the latter is mounted on the support.

14. The lateral guide device as claimed in claim 13, wherein the retaining element comprises first and second lateral holding walls which form, together with the retaining wall, a trough for retaining and laterally holding the roller in its the removal position.

15. The lateral guide device as claimed in claim 1, wherein, in the removal position, the roller is held inclined upward from its lower point.

16. The lateral guide device as claimed in claim 1, wherein the lower and upper points of the support define a support axis, and an angle of downward tilting of the roller in the removal position relative to this support axis is strictly greater than 0° and less than or equal to 45°.

17. The lateral guide device as claimed in claim 1, wherein the lock comprises a clamping nut and a threaded pin attached to the support, and wherein the first part comprises an oblong through-opening which is positioned and oriented such that the first part allows the threaded pin to pass through the first part when the first part is brought into said operational position.

18. The lateral guide device as claimed in claim 1, the device comprising at least one entry point protection element which is attached to a fixed part of the support, preferably removably, and which prevents access to the roller from at least one of its two main sides, said protection element comprising a rectangular plate of which a width is greater than a diameter of the roller and of which a length is greater than length of the roller.

19. The lateral guide device as claimed in claim 1, wherein the support comprises a fixed bearing element and the lock allows the first part to be clamped against the fixed bearing element.

20. The lateral guide device as claimed in claim 19, wherein the fixed bearing element comprises a centering element which is able to cooperate with a complementary centering element of the first part of the support so as to center the first part of the support when it the first part is brought into said operational position and is locked by being clamped against the fixed bearing element.

21. The lateral guide device as claimed in claim 20, wherein the bearing element comprises a bearing plate, a bearing edge of which comprises a male centering element, and wherein the first part of the support comprises a centering through-opening which is oblong in shape and which is dimensioned and oriented relative to the male centering element such that, when the first part of the support moves from the retracted position into the operational position, the centering opening is positioned facing the male centering element and the male centering element passes through the centering opening, thereby guiding and centering the first part of the support into the operational position bearing on the bearing edge of the bearing plate.

22. The lateral guide device as claimed in claim 1, wherein the first part of the support is able to be lowered relative to the roller from said operational position in which the first part supports the axle of the roller so as to be completely disengaged from the axle of the roller without moving the roller upward and in particular without pivoting the roller upward.

23. The lateral guide device as claimed in claim 1, wherein the first part of the support is able to be moved relative to the roller into the retracted position in which the first portion of the support is not aligned with the first end of the axle of the roller.

24. The lateral guide device as claimed in claim 22, wherein the first part of the support comprises a recess which is able to accommodate the first end of the axle of the roller when the first part of the support is in the operational position and to be completely disengaged from the first end of the axle of the roller when the first part of the support is moved relative to the roller so as to be brought into the retracted position without moving the roller upward and in particular without pivoting the roller upward.

25. The lateral guide device as claimed in claim 24, wherein said recess is able to allow the end of the axle of the roller to be inserted into the recess from above.

26. The lateral guide device as claimed in claim 24, wherein said recess is able to be completely disengaged from the first end of the axle of the roller by lowering the first part of the support relative to the roller from the operational position.

27. The lateral guide device as claimed in claim 24, wherein said recess has a U-shaped profile.

28. The lateral guide device as claimed in claim 24, wherein the first part of the support comprises an upper plate in which a notch is made to form said recess.

29. The lateral guide device as claimed in claim 1, wherein the first part of the support is able to be moved downward, from said operational position, while vertically retaining the roller which pivots downward under the effect of gravity, until the roller is blocked vertically in the removal position by the retaining element.

30. The lateral guide device as claimed in claim 1, wherein the support comprises a rotatable hinge that makes it possible for the first part of the support to pivot between said operational position and said retracted position and wherein the rotatable hinge of the first part of the support is positioned under the roller between the first end and the second end of the axle of the roller.

31. The lateral guide device as claimed in claim 1, wherein the first part of the support comprises a main arm which is rotatably hinged and which is inclined outward from the roller and upward relative to the horizontal, at least when the first part of the support is in the operational position.

32. The lateral guide device as claimed in claim 31, wherein the arm is hinged so as to be able to pivot downward into a retracted position in which the arm is oriented substantially horizontally.

33. The lateral guide device as claimed in claim 1, wherein the retaining element is fixed relative to the second part of the support and the first part of the support is movable relative to the retaining element.

34. The lateral guide device as claimed in claim 1, wherein the first portion of the support is able to be completely disengaged from the first end of the axle of the roller by lowering the first portion of the support from said operational position in which it the the first portion supports the roller and without moving the roller upward, in particular without pivoting the roller upward.

35. A lateral guide device for laterally guiding an endless conveyor belt of a trough conveyor, the device comprising:
a support;
an idle guide roller which is able to be mounted in a removable manner on the support between a first part that makes it possible to support, in an operational position, a first end of the an axle of the roller at an upper point and a second part that makes it possible to support a second end of the axle of the roller at a lower point, wherein the first part of the support is movable between said operational position and a retracted position in which the first part of the support is completely disengaged from the first end of the axle of the roller; and
a lock which locks the first part of the support in said operational position,
wherein the support comprises a fixed bearing element and the lock clamps the first part against this fixed bearing element, and the fixed bearing element comprises a centering element which is able to cooperate with a complementary centering element of the first part of the support so as to center the first part when the first part is brought into said operational position and is locked by being clamped against the fixed bearing element.

36. The lateral guide device as claimed in claim 35, wherein the bearing element comprises a bearing plate, a bearing edge of which comprises a male centering element, and wherein the first part of the support comprises a centering through-opening and which is dimensioned and oriented relative to the male centering element such that, when the first part of the support moves from its retracted position into the operational position, the centering opening is positioned facing the male centering element and the male centering element passes through the centering opening, thereby guiding and centering the first part of the support into its the operational position bearing on the bearing edge of the bearing plate.

37. A lateral guide assembly for laterally guiding an endless conveyor belt of a trough conveyor, wherein the assembly defines a central conveying axis and comprises:
at least one pair of first and second lateral guide devices, wherein at least the first lateral guide device is a lateral guide device as claimed in claim 1 and the second lateral guide device has a same structure or a different structure than the first lateral guide device, wherein said first and second lateral guide devices are positioned on either side of the central conveying axis, at a distance from one another, the lower point of the support of the first lateral guide device being closer to the central conveying axis than the upper point of the support of the first lateral guide device.

38. The lateral guide assembly as claimed in claim 37, wherein said second lateral guide device has a same structure as the first lateral guide device, and the lower point of the support of the second lateral guide device is closer to the central conveying axis than the upper point of the support of the second lateral quide device.

39. The lateral guide assembly as claimed in claim 37, wherein the first and second lateral guide devices are mounted on a same crossmember.

40. A trough conveyor comprising:
a conveyor belt, which is deformable so as to form a trough, and one or more lateral guide devices as claimed in claim 1.

41. A removal method for comprising:
removing the idle guide roller from the lateral guide device of claim 1, wherein the idle guide roller is mounted in contact with a carrying run of a endless conveyor belt of the trough conveyor (C), the carrying run exerting pressure on the idle guide roller (11) and being locally deformed or kept locally deformed by said roller, said removing comprising the following consecutive steps:
(a) unlocking the first part of the support;
(b) retracting the first part so as to release the first end of the axle of the roller at the upper point, such that the roller remains supported at the second end at the lower point of the support and is held vertically by the retaining element of the support in the removal position;
(c) removing the roller from the support.

42. The removal method as claimed in claim 41, wherein, in step (b), the roller pivots downward under the effect of gravity until the roller is held vertically by the retaining element of the support in said removal position.

43. The removal method as claimed in claim 42, wherein, in step (b), the first part of the support is retracted in such a way that the first part of the support retains the roller vertically, the roller pivoting downward under the effect of gravity, until the roller is blocked vertically in the removal position by the retaining element of the support.

44. A method comprising:
mounting the idle guide roller of the lateral guide device claim 1, the support of which is already mounted in the trough conveyor comprising the endless conveyor belt, which is deformable so as to form a trough or be kept as a trough, said mounting comprising the following consecutive steps:
(a) with the first part of the support retracted, positioning the roller relative to the support and moving the roller so as to position the second end of the axle of the roller on the second part of the support so that the second end is supported at a lower point, the roller being retained vertically by the retaining element of the support;
(b) lifting the roller by pivoting the roller upward so as to bring the roller into contact with a carrying run of the conveyor belt;
(c) bringing the first part of the support into the operational position and locking the first part in this position;
(d) positioning the first end of the axle of the roller is on the second part of the support so that the first end is supported at an upper point of the support.

45. The mounting method as claimed in claim 44, wherein, in step (b), the roller is pivoted upward using a lever and by using the retaining element as a fulcrum of the lever.

46. A method comprising:

removing the idle guide roller from the lateral guide device of claim 35, wherein the roller is mounted in contact with a carrying run of the endless conveyor belt of the trough conveyor, the carrying run exerting pressure on the idle guide roller and being locally deformed or kept locally deformed by said roller, said removing comprising the following consecutive steps:

(a) unlocking the first part of the support;

(b) retracting the first part so as to release the first end of the axle of the roller at the upper point and to disengage the centering element of the fixed bearing element from the complementary centering element of the first part of the support;

(c) removing the roller from the support by pulling the roller in an axial direction in order to completely disengage the second end at the lower point from the second part of the support.

47. A method comprising:

mounting the idle guide roller of the lateral guide device of claim 35, the support of which being already mounted in the trough conveyor comprising the endless conveyor belt, which is deformable so as to form a trough or be kept as a trough, said mounting comprising the following consecutive steps:

(a) with the first part of the support retracted, positioning the roller relative to the support and moving the roller so as to position the second end of the axle of the roller on the second part of the support so that the roller is supported at the lower point of the support;

(b) lifting the roller by pivoting the roller upward so as to bring the roller into contact with a carrying run of the conveyor belt;

(c) bringing the first part of the support into the operational position by centering the first part by using the complementary centering elements and locking the first part in the operational position;

(d) positioning the first end of the axle of the roller on the first part of the support so that the first part is supported at the upper point of the support.

48. A method comprising using the trough conveyor as claimed in claim 40 for bulk conveying.

* * * * *